(12) United States Patent
Aso

(10) Patent No.: US 8,090,493 B2
(45) Date of Patent: Jan. 3, 2012

(54) VEHICLE STATE QUANTITY PREDICTING APPARATUS AND VEHICLE STEERING CONTROLLER USING THE SAME, AND A METHOD FOR PREDICTING A VEHICLE STATE QUANTITY AND VEHICLE STEERING CONTROLLING METHOD USING THE SAME

(75) Inventor: Makoto Aso, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 560 days.

(21) Appl. No.: 12/226,746

(22) PCT Filed: Jun. 18, 2007

(86) PCT No.: PCT/IB2007/001623
§ 371 (c)(1),
(2), (4) Date: Oct. 27, 2008

(87) PCT Pub. No.: WO2007/148193
PCT Pub. Date: Dec. 27, 2007

(65) Prior Publication Data
US 2009/0093924 A1      Apr. 9, 2009

(30) Foreign Application Priority Data
Jun. 19, 2006   (JP) ................................. 2006-169187

(51) Int. Cl.
*G06F 7/00* (2006.01)
(52) U.S. Cl. ........................................................ 701/29
(58) Field of Classification Search ............... 701/29, 701/41–42, 59–60
See application file for complete search history.

(56) References Cited

U.S. PATENT DOCUMENTS

| | | | |
|---|---|---|---|
| 5,957,983 | A | 9/1999 | Tominaga |
| 6,269,897 | B1 | 8/2001 | Tamura et al. |
| 2003/0191572 | A1 * | 10/2003 | Roll et al. ................... 701/70 |

FOREIGN PATENT DOCUMENTS

| | | |
|---|---|---|
| DE | 197 10 234 A1 | 11/1997 |
| JP | A-06-288776 | 10/1994 |
| JP | A-08-159787 | 6/1996 |
| JP | A-08-263790 | 10/1996 |
| JP | A-09-002317 | 1/1997 |
| JP | A-09-297153 | 11/1997 |
| JP | A-10-100925 | 4/1998 |
| JP | A-10-119807 | 5/1998 |
| JP | A-2001-034341 | 2/2001 |
| JP | A-2001-242242 | 9/2001 |
| JP | A-2005-132291 | 5/2005 |
| JP | A-2007-516906 | 6/2007 |
| JP | A-2007-302204 | 11/2007 |
| JP | A-2007-534041 | 11/2007 |

* cited by examiner

*Primary Examiner* — Kim T Nguyen
(74) *Attorney, Agent, or Firm* — Oliff & Berridge, PLC

(57) ABSTRACT

A vehicle state quantity prediction apparatus has sensors such as a GPS receiver that observe prescribed state quantities representing a movement state of a vehicle and a Kalman filter that inputs the state quantities observed by the sensors into a model of the movement state of the vehicle to predict a state quantity including the prescribed state quantities representing a movement of the vehicle. The reliability of the prescribed state quantities observed by the sensors is evaluated, and the degree to which the prescribed state quantities are reflected in the Kalman filter is set based on the evaluated reliability.

16 Claims, 6 Drawing Sheets

VEHICLE STATE QUANTITY PREDICTING APPARATUS AND VEHICLE STEERING CONTROLLER USING THE SAME, AND A METHOD FOR PREDICTING A VEHICLE STATE QUANTITY AND VEHICLE STEERING CONTROLLING METHOD USING THE SAME

BACKGROUND OF THE INVENTION

1. Field of the Invention

The present invention relates to a vehicle state quantity predictor and method for predicting state quantities representing the movement of a vehicle. More specifically, the present invention relates to a vehicle state quantity predictor and method for predicting a state quantity of a vehicle that models the movement of a vehicle to calculate a state quantity thereof to predict the actual state quantity of the vehicle. The present invention also relates to a vehicle steering controller and method using a vehicle state quantity predictor and method of predicting a vehicle state quantity.

2. Description of the Related Art

An existing vehicle driving system has been described in which a vehicle is driven on a pre-established road surface adapted for use with automatic steering control system. In the described vehicle driving system, markers (magnetic markers) are installed in the road surface at prescribed intervals along the path of travel of the vehicle. Each time the vehicle passes a marker, a detection signal is output from a marker sensor mounted on board the vehicle. The detection signal indicates the relative positional relationship between the marker and the vehicle and is used as the basis for detecting the lateral displacement of the vehicle in the path of vehicle travel. The vehicle is automatically steered to avoid deviating from the path of vehicle travel, based on the lateral displacement detected as the vehicle passes each marker.

In the described existing vehicle driving system, in order to achieve greater steering control accuracy, the use of Kalman filters to predict state quantities representing the yaw and lateral translation of the vehicle required for steering control (for example, as described in Japanese Patent Application Publication No. JP-A-2001-34341) has been proposed. JP-A-2001-34341 describes using the Kalman filter to calculated the predicted values of four state quantities (yaw rate, yaw angle, lateral displacement speed, and lateral displacement) defined as state quantities representing the yaw and the lateral translation of the vehicle, using the observed value of the lateral displacement obtained each time the vehicle passes a marker.

In JP-A-2001-34341 a distance-domain Kalman filter that acquires the observed lateral displacement and observed yaw rate each time the vehicle passes a magnetic marker and predicts the values of state quantities of the vehicle using the observed values, and a time-domain Kalman filter that acquires the observed yaw raw rate at prescribed time intervals and that uses the predicted value calculated the previous time to calculate the predicted values of the state quantities of the vehicle using the observed values. Each time the distance-domain Kalman filter acquires a predicted amount, the time-domain Kalman filter uses the value predicted by the distance-domain Kalman filter in place of the predicted value from the previous time to calculate the predicted value of the state quantities of the vehicle. That is, by causing the predicted values of the vehicle acquired by the distance-domain Kalman filter for each magnetic marker to be reflected in the prediction by the time-domain Kalman filter, the accuracy of predicting the state quantities of the vehicle is improved, even between markers at which the lateral displacement cannot be observed.

However, JP-A-2001-34341 indicates that because until the next magnetic marker is passed, the predicted value obtained by the distance-domain Kalman filter at the immediately previous passing of a magnetic marker is reflected in the prediction by the time-domain Kalman filter, if there is a large lateral translation of the vehicle between magnetic markers, there is a tendency for the prediction error of state quantities between the magnetic marker to become large. That is, because lateral translation cannot be observed between magnetic markers, errors caused by the construction of the actual road surface, yaw rate drift, and modeling of the vehicle tend to accumulate. The result is that, in the case in which the period of having the predicted value obtained by the distance-domain Kalman filter reflected in the time-domain Kalman filter becomes long (for example, when traveling at a very slow speed along a curve with a high curvature rate), the error in prediction by the time-domain Kalman filter during magnetic marker tends to increase.

SUMMARY OF THE INVENTION

Given the above, the present invention provides a vehicle state quantity prediction apparatus and method that improve the accuracy of predicting state quantities representing the movement of a vehicle. The present invention also provides a steering control apparatus and method that use the above-noted vehicle state quantity prediction apparatus and method.

A first aspect of the present invention is a vehicle state quantity prediction apparatus that includes a plurality of observation apparatuses that observe prescribed state quantities that represent the movement of a vehicle; a prediction apparatus that inputs prescribed state quantities observed by the observation apparatuses into a model of a vehicle to predict state quantities representing the movement of the vehicle; and an evaluation apparatus that sets the reliability of prescribed state quantities observed by the observation apparatuses for each observation apparatus. In the first aspect, the degree to which the prescribed state quantities observed by the observation apparatuses are reflected in the model is set based on the reliability set by the evaluation apparatus. By doing this, it is possible to perform state quantity prediction that is robust, even if the observation accuracy of a part of the observation apparatuses decreases because of a worsening of the observation condition or observation environment.

The evaluation apparatus may set the reliability based on an observed state that is determined based on the observation results of the observation apparatuses themselves, and set a lower reliability, the larger the observation error of the observed state is. By doing this, because it is possible to limit the degree to which the observation results are reflected in the model if the observation condition is such that the observation error is large, it is possible to perform state quantity prediction that is robust, even if the observation accuracy of the observation apparatuses decreases because of a worsening of the observation condition.

The evaluation apparatus may set the reliability based on the observation environment when the prescribed state quantity is observed, and set a lower reliability, the larger the observation error is in the observation environment. By doing this, because it is possible to limit the degree to which the observation results are reflected in the model if the observation environment is objectively determined to have a large observation error, it is possible to perform state quantity prediction that is robust, even if the observation accuracy decreases because of a worsening of the observation environment.

The evaluation apparatus may evaluate the reliability based on the time that has elapsed since the prescribed state quantity was observed, and sets a lower reliability the longer the elapsed time is. By doing this, because it is possible to reflect in the model the degree of accuracy of observed data, which decreases with the elapse of time from the time of observation, it is possible to perform state quantity prediction that is robust, even when the observation accuracy decreases because of the passage of time. It is possible, for example, to perform robust prediction of state quantities even if errors due to the construction of the actual road or vehicle modeling errors accumulate over time.

The evaluation apparatus may evaluate the reliability based on a traveled distance from an observation point at which the prescribed state quantity was observed, and set the reliability lower the longer the traveled distance is. By doing this, because it is possible to reflect in the model the degree of accuracy of observed data, which decreases with a distance traveled from the time of observation, it is possible to perform state quantity prediction that is robust, even in the case in which the observation accuracy decreases because of an increased distance traveled from the observation point. It is possible, for example, to perform robust prediction of state quantities even if errors due to the construction of the actual road or vehicle modeling errors accumulate over time.

In the foregoing aspects, the prediction apparatus may be a Kalman filter, in which a term of the standard deviation of the observation error of each observed value is added to an observation equation of the Kalman filter, the standard deviation being larger, the lower the reliability is evaluated.

A second aspect of the present invention provides a vehicle steering controller having the vehicle state quantity prediction apparatus according to the foregoing aspects; and a control signal generator that generates a control signal for a steering actuator in a steering system, based on a state quantity representing the movement of the vehicle, which is predicted by the vehicle state quantity prediction apparatus.

A third aspect of the present invention is a method for predicting a state quantity of a vehicle that is implemented by observing a plurality of prescribed state quantities that represent the movement of a vehicle; inputting the prescribed observed state quantities into a model of the movement of the vehicle to predict state quantities representing the movement of the vehicle; setting the reliability of the prescribed observed state quantities for each observation; and setting the degree to which the prescribed observed state quantities are reflected in the model based on the set reliability.

A fourth aspect of the present invention is a vehicle steering control method, that is implemented by predicting a state quantity representing the movement of a vehicle by the method of predicting a state quantity of a vehicle according to the third aspect; and generating a control signal for a steering actuator in a steering system, based on the state quantity that represents the movement of the vehicle.

Aspects of the present invention can implement a vehicle state quantity prediction apparatus and method that improves the accuracy of predicting state quantities representing the movement of a vehicle. It is further possible to implement a vehicle steering controller and method using the vehicle state quantity prediction apparatus and method.

BRIEF DESCRIPTION OF THE DRAWINGS

The foregoing and further objects, features, and advantages of the invention will become apparent from the following description of embodiments with reference to the accompanying drawings, wherein like numerals are used to represent like elements, and wherein.

DETAILED DESCRIPTION OF EXAMPLE EMBODIMENTS

An example embodiment of the present invention is described below, with reference made to the accompanying drawings. A vehicle state quantity predicting apparatus according to an embodiment of the present invention predicts state quantities of a vehicle using a Kalman filter, and in particular predicts state quantities representing the movement of the vehicle in the lateral direction (yaw and lateral translation). Specifically, for example, the yaw rate, yaw angle, lateral displacement speed, and lateral position (lateral displacement) are predicted as state quantities representing the movement of the vehicle in the lateral direction.

Figure 1:
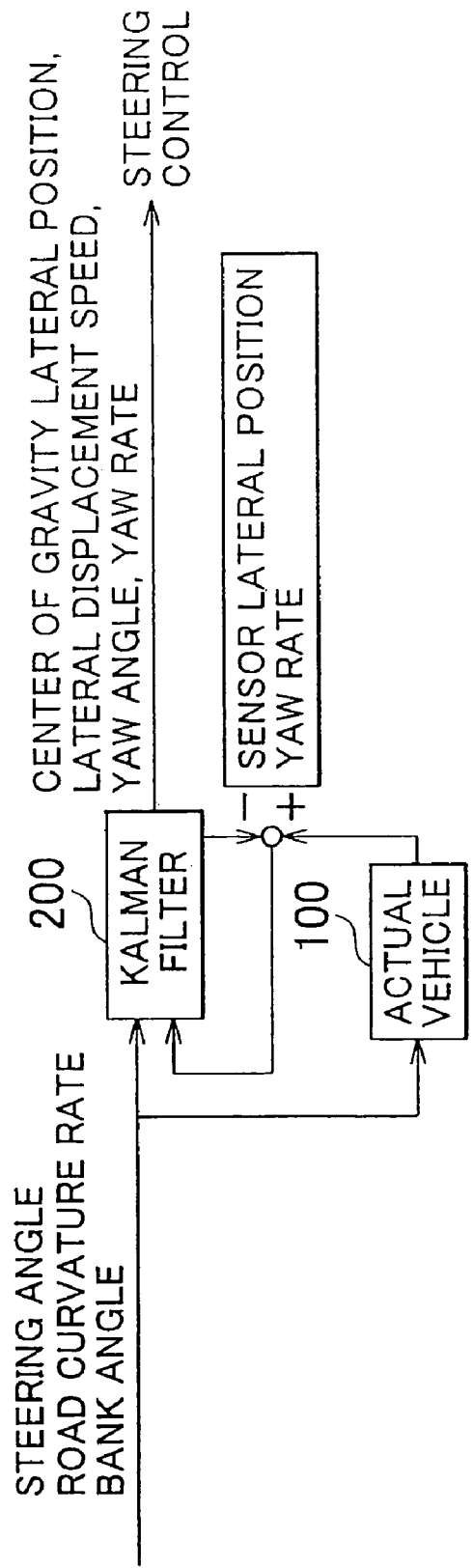
FIG. 1 is a block diagram describing the approach used in a Kalman filter.

The approach used in the prediction will be generally described using FIG. 1. In FIG. 1, the steering of a vehicle 100 is, for example, controlled so that the vehicle 100 travels along a path on which magnetic markers are discretely placed. The movement of the vehicle 100 in the lateral direction is affected by factors such as the steering angle, the vehicle speed, the curvature of the road, and the bank angle (cant). Of the state quantities representing the movement (yaw rate, yaw angle, lateral displacement speed, and lateral position), the yaw rate is autonomously observed based on a detection signal from a yaw rate sensor, and the lateral position is observed based on the detection signal detected at each magnetic marker by a marker sensor such as a magnetic sensor. The lateral position is also autonomously observed based on a detection signal from a GPS receiver capable of identifying the position of the vehicle or a white line recognition apparatus capable of recognizing a white line drawn along the path of travel.

The Kalman filter 200 models the movement of the vehicle 100, which is influenced by factors such as the above-noted steering angle, wheel speed, road curvature, and bank angle, and uses these factors along with the lateral position and yaw rate observed as noted above and also the predicted value from the previous time to calculate the predicted values of the yaw rate, yaw angle, lateral displacement speed, and lateral position. The actually observed yaw rate and lateral position include steady-state noise components (measurement noise) associated with the yaw rate sensor, the marker sensor, the white line recognition measurement, and the GPS measurement, as well as characteristic noise components (system noise) of the vehicle 100. The calculations by the Kalman filter 200 of the various predicted values of state quantities (yaw rate, yaw angle, lateral displacement speed, and lateral position) are repeatedly performed to eliminate the above-noted noise components, so that the predicted values of the state quantities converges to the true values thereof.

Figure 2:
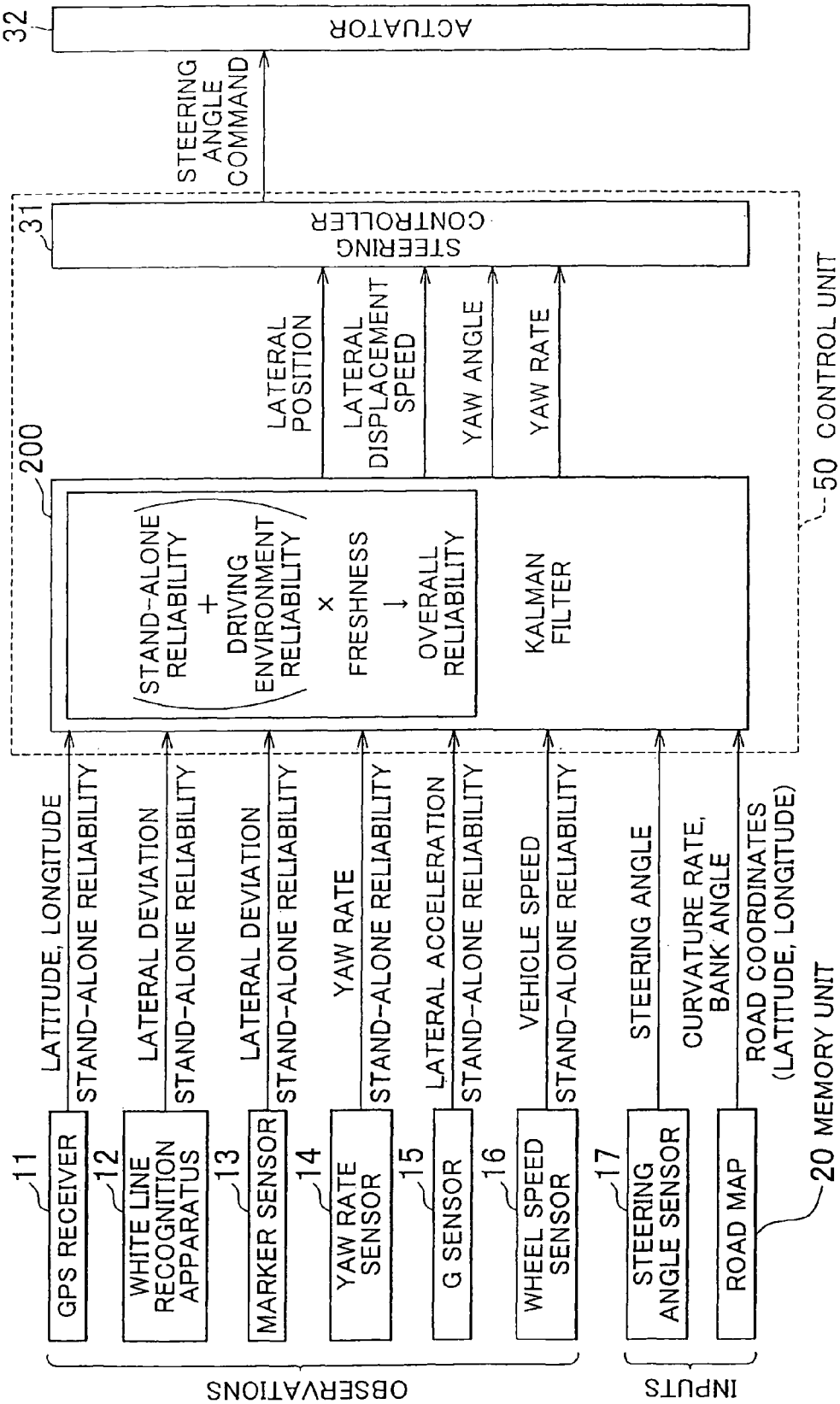
FIG. 2 is a block diagram showing the configuration of the automatic steering apparatus in a vehicle to which the vehicle state quantity prediction apparatus of the example embodiment of the present invention is applied.

A steering controller for a vehicle using a vehicle state quantity predicting apparatus that utilizes the above-noted Kalman filter is configured, for example, as shown in FIG. 2. In FIG. 2, a GPS receiver 11, a white line recognition apparatus 12, a marker sensor 13, a yaw rate sensor 14, a G sensor 15, a wheel speed sensor 16, and a steering angle sensor 17 are connected to a control unit (ECU) 50. The GPS receiver 11 outputs a detection signal that indicates coordinate information (for example, latitude and longitude) related to the position of the vehicle identified by information received from a GPS satellite. The white line recognition apparatus 12 outputs a detection signal that indicates the relative positional relationship in the lateral direction of the vehicle to a white line drawn along the path of travel. The marker sensor 13 outputs a detection signal that indicates the magnitude of magnetism generated by a magnetic marker (lane marker). When the vehicle passes one of the magnetic markers located along the path of travel, the marker sensor 13 outputs a detection signal that indicates the relative positional relationship between the magnetic marker and the lateral position of the vehicle. The yaw rate sensor 14 outputs a detection signal that indicates the yaw rate of the vehicle while the vehicle is moving. The G sensor 15 outputs a detection signal that indicates the lateral acceleration of the vehicle while the vehicle is moving. The wheel speed sensor 16 outputs a pulse signal as a detection signal that indicates the rotational speed of a wheel (corresponding to the speed of the vehicle) of the moving vehicle. The steering angle sensor 17 outputs a detection signal that indicates the steering angle of the steered wheels (front wheels).

A memory unit 20 stores the contour (rate of curvature, bank angle, number of lanes in the road, lane width, and altitude or the like) of a road that is traveled by the vehicle, map information regarding surrounding roads and structures (such as houses, buildings, intersections, railroad crossings, parking lots, and toll booths of toll roads), and also coordinate data beforehand, and the control unit 50 reads out map information from the memory unit 20 as required. The map information in the memory unit 20 may be updated by inter-vehicle communication, road-to-vehicle communication, communication with a prescribed external control center, or via a medium such as a CD or a DVD.

The control unit 50 has the above-described Kalman filter 200 function and a function for steering the vehicle. Prediction calculation of state quantities representing the movement of the vehicle in the lateral direction (yaw rate, yaw angle, lateral displacement speed, and lateral position) is performed by the Kalman filter 200 function, and a vehicle steering controller 31 calculates the steering angle based on the calculated predicted state quantities, and outputs a steering control signal in accordance with the calculated steering angle. In this manner, a steering actuator 32 provided in the steering system is driven based on the steering control signal output from the control unit 50.

The following definitions are used by the Kalman filter 200 of the control unit 50.

State quantity $x = (\eta, \eta', \theta, \gamma)^T$
Influencing factor (input quantity) $u = (\delta, \kappa, a)^T$
System noise $w = (w\eta, w\eta', w\theta, w\gamma)^T$
Observed quantity $y = (D_{mag}, D_{gps}, D_{wl}, \gamma y)^T$
Observation error standard deviation $\sigma = (\sigma_{mag}, \sigma_{gps}, \sigma_{wl}, \sigma\gamma)^T$ Using these definitions, the control unit 50 formulates the state equation indicated by equation (1) and the observation equation indicated by equation (2). The notation $()^T$ indicates a transposed matrix. Also, $\eta'$ and "dot $\eta$" in equations have the same meanings.

$$\frac{d}{dt}\begin{pmatrix}\eta\\ \dot\eta\\ \theta\\ \gamma\end{pmatrix} = \overbrace{\begin{pmatrix}0 & 1 & 0 & 0\\ 0 & \frac{A_1}{V} & -A_1 & \frac{A_2}{V}\\ 0 & 0 & 0 & 1\\ 0 & \frac{A_3}{V} & -A_3 & \frac{A_4}{V}\end{pmatrix}}^{A}\begin{pmatrix}\eta\\ \dot\eta\\ \theta\\ \gamma\end{pmatrix} + \overbrace{\begin{pmatrix}0 & 0 & 0\\ \frac{K_f}{m} & -V^2 & g\\ 0 & -V & 0\\ \frac{K_f l_f}{I} & 0 & 0\end{pmatrix}}^{B}\begin{pmatrix}\delta\\ \kappa\\ \alpha\end{pmatrix} + \overbrace{\begin{pmatrix}1 & 0 & 0 & 0\\ 0 & 1 & 0 & 0\\ 0 & 0 & 1 & 0\\ 0 & 0 & 0 & 1\end{pmatrix}}^{G}\begin{pmatrix}w_\eta\\ w_{\dot\eta}\\ w_\theta\\ w_\gamma\end{pmatrix} \quad (1)$$

Where $$A_1 = -\frac{K_f + K_r}{m},\ A_2 = -\frac{K_f l_f - K_r l_r}{m}$$

$$A_3 = -\frac{K_f l_f - K_r l_r}{I},\ A_4 = -\frac{K_f l_f^2 + K_r l_r^2}{I}$$

In the above:

$$\begin{pmatrix}D_{mag}\\ D_{gps}\\ D_{wl}\\ \gamma_y\end{pmatrix} = \overbrace{\begin{pmatrix}1 & 0 & L_{mag} & 0\\ 1 & 0 & 0 & 0\\ 1 & 0 & L_{wl} & 0\\ 0 & 0 & 1 & 1\end{pmatrix}}^{C}\begin{pmatrix}\eta\\ \dot\eta\\ \theta\\ \gamma\end{pmatrix} + \overbrace{\begin{pmatrix}0 & -\frac{1}{2}L_{mag}^2 & 0\\ 0 & 0 & 0\\ 0 & -\frac{1}{2}L_{wl}^2 & 0\\ 0 & 0 & 0\end{pmatrix}}^{D}\begin{pmatrix}\delta\\ \kappa\\ \alpha\end{pmatrix} + \begin{pmatrix}\sigma_{mag}\\ \sigma_{gps}\\ \sigma_{wl}\\ \sigma_{yr}\end{pmatrix}$$

The (d/dt) in equation (1) is the differential operator with respect to time t. The variables in the state equation (1) and the observation equation (2) are defined as follows.

η: Lateral position of the vehicle center of gravity
η': Lateral displacement speed of the vehicle center of gravity (derivative of the lateral position of the vehicle center of gravity)
θ: Yaw angle with respect to the tangent to the road
γ: Yaw rate
δ: Steering angle (detected by the steering angle sensor 17)
κ: Road curvature ratio (acquired from map information)
a: Bank angle (acquired from map information)
Dmag, Dgps, Dwl: Lateral positions (observed values)
γy: Yaw rate (observed value)
wη, wη', wθ, wγ: State quantity system noise
V: Vehicle speed (detected by the wheel speed sensor 11)
g: Gravitational acceleration
m: Vehicle mass
I: Yaw momentum mass
Kf, Kr: Cornering power at the front and rear wheels
lf, lr: Distance between the center of gravity and the front and rear wheels
Lmag: Distance from the center of gravity to the marker sensor
Lwl: Distance from the center of gravity to the white line recognition camera The observation error standard deviation σ in the observation equation (2) will be described later.

Figure 3:
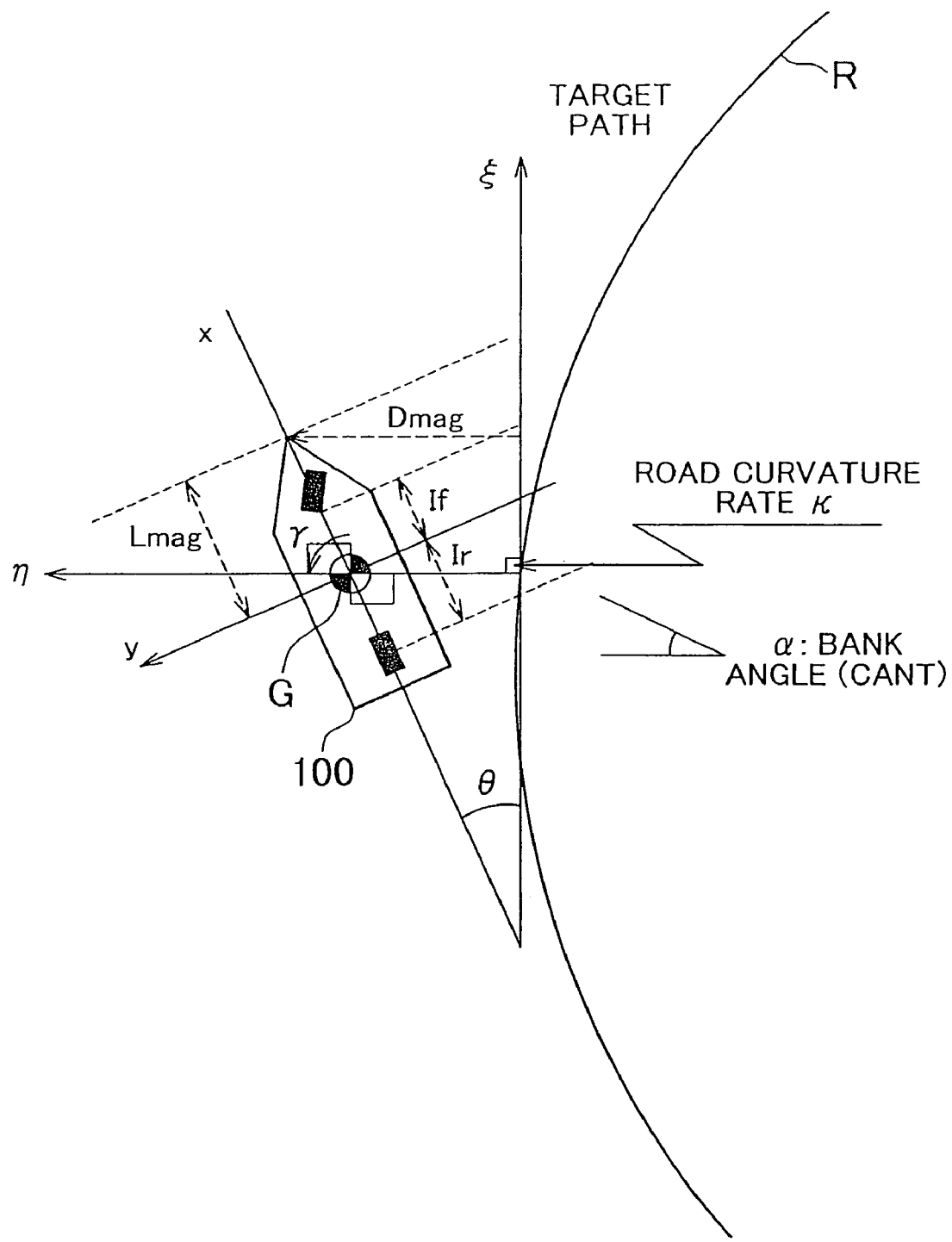
FIG. 3 is a drawing showing the definitions of coordinate axis system relative to the vehicle and variables regarding a modeled vehicle.

The above-noted variables are defined in the coordinate system as shown in FIG. 3. Specifically, the relationship of the vehicle 100 and the path R is set so that the center of gravity G of the vehicle 100 (two-wheel model) is positioned in the direction η perpendicular to the tangent ξ of the road R (target path) having a curvature ratio κ. The distances lf and lr between the center of gravity G and the front and rear wheels are defined in the coordinate system x-y in the front-rear/left-right directions with the center of gravity G as the origin. Also, the yaw rate γ and the yaw rate about the center of gravity G are defined as state quantities. The lateral displacement D is defined as the distance in the above-noted direction η from the path R to the marker sensor (mounted at the front end of the vehicle 100). The yaw angle θ as a state quantity is defined as the angle made by the tangential direction ξ to the path R and the longitudinal axis of the vehicle x.

By having the Kalman filter 200 repeatedly calculate the predicted values of state quantities (yaw rate, yaw angle, lateral displacement speed, and lateral position) based on the above-noted state equation (1) and observation equation (2), the above-noted noise components are removed from the various predicted values of the state quantities, which converge to the true values thereof. In the process of repeatedly calculating the predicted values by processing in the Kalman filter 200, the predicted values acquired the previous time when solving the differential equations indicated in the state quantity equation (1) are used.

Additionally, in the Kalman filter 200, the covariance equation shown by equation (3) is used to determine the current prediction error covariance matrix $P_{K(t/t)}$ using the prediction error covariance matrix $P_{K(t/t-1)}$ predicted the previous time. In the Kalman filter 200, the covariance equation (3) is solved and the current prediction error covariance matrix $P_{K(t)/t}$ is determined. Additionally, in the Kalman filter 200, the covariance equation shown by equation (4) is solved to predict the next prediction error covariance matrix $P_{K(t+1/t)}$ using the prediction error covariance matrix $P_{K(t/t)}$ predicted the current time, and the next prediction error covariance matrix $P_{K(t+1/t)}$ is predicted.

$$P_{K(t/t)} = P_{K(t/t-1)} - K_{K(t)} C_{(t)} P_{K(t/t-1)} \quad (3)$$

$$P_{K(t+1/t)} = A_{(t)} P_{K(t/t)} A_{(t)}^T - G_{(t)} Q_{K(t)} G_{(t)}^T \quad (4)$$

The prediction error distribution matrix $P_K$ is shown by equation (5). The diagonally opposed values of the prediction error covariance matrix $P_K$ indicate the prediction errors (and, by extension, correspond to the detection errors for the observed quantities and input quantities used in predicting the values) of the lateral position, lateral displacement speed, yaw angle, and yaw rate predicted by the Kalman filter 200. That is, as the diagonal value of the prediction error covariance matrix $P_K$ increases, the prediction accuracy of the state quantity x corresponding to the diagonal value (and, by extension, the lower is the detection accuracy the observed quantities and input quantities used in predicting the values) decreases, that is, the prediction error increases. The $K_{K(t)}$ of equation (3) is the Kalman gain, which is determined by equation (6). The matrix C of equation (3) corresponds to the matrix C in equation (2), the matrix A of equation (4) corresponds to the matrix A in equation (1), and the matrix G of equation (4) corresponds to the matrix G in equation (1). The matrix $Q_K$ of equation (4) is represented by equation (7), the diagonal values of which are the standard deviations of the system noises. The values of the matrix $Q_K$ are set to values corresponding to the lateral displacement η, the lateral displacement speed η', the yaw angle θ, and the yaw rate γ. Each of these values may be pre-established as fixed values, or alternatively may be variable values set in response to variations such as external disturbance.

$$P_K = \begin{pmatrix} P_{lat} & \cdots & \cdots & \cdots \\ \cdots & P_{dlat} & \cdots & \cdots \\ \cdots & \cdots & P_{yaw} & \cdots \\ \cdots & \cdots & \cdots & P_{yr} \end{pmatrix} \quad (5)$$

$$K_{K(t)} = P_{K(t/t-1)} C_{(t)}^T (C_{(t)} P_{(t/t-1)} C_{(t)}^T + R_{K(t)})^{-1} \quad (6)$$

$$Q_K = \begin{pmatrix} \sigma_\eta & 0 & 0 & 0 \\ 0 & \sigma_{\dot\eta} & 0 & 0 \\ 0 & 0 & \sigma_\theta & 0 \\ 0 & 0 & 0 & \sigma_\gamma \end{pmatrix} \quad (7)$$

$$R_K = \begin{pmatrix} \sigma_{mag} & 0 & 0 & 0 \\ 0 & \sigma_{gps} & 0 & 0 \\ 0 & 0 & \sigma_{wl} & 0 \\ 0 & 0 & 0 & \sigma_{yy} \end{pmatrix} \quad (8)$$

$$E\left(\begin{pmatrix} w_t \\ \sigma_t \end{pmatrix} (w_\tau^T \quad \sigma_\tau^T)\right) = \begin{pmatrix} Q_K & 0 \\ 0 & R_K \end{pmatrix} \delta_{t\tau} \quad (9)$$

The symbols "•" in the matrix $P_K$ of equation (5) indicate arbitrary values. The matrix C of equation (6) corresponds to the matrix C of equation (2). The matrix $R_K$ of equation (6) is represented by equation (8), the diagonal values of which are the observation error standard deviations. The values of the matrix $R_K$ are set to values corresponding to the lateral position Dmag, the lateral position Dgps, the lateral position Dwl, and the yaw rate γy. The matrix $Q_K$ and the matrix $R_K$ are related to the above-noted system noise w and the observation error standard deviation σ as represented by equation (9). The E in equation (9) is a symbol meaning a correlation calculation. The $\delta_{t\tau}$ in equation (9) is a symbol meaning the Kronecker delta and, when t=τ, $\delta_{t\tau}$=1, but when t is not equal to τ, $\delta_{t\tau}$=0.

The actual calculations performed by the Kalman filter 200 will now be described. In the Kalman filter 200, in order to solve the state equation (1) and the observation equation (2), the filter equation represented by equation (10) is set up. The "hatted x" in the equation indicates the predicted value of x. In the Kalman filter 200, the current observed quantity $y_{(t)}$ and the previous predicted state quantity $x_{(t/t-1)}$ are used to solve the filter equation (10), and the current time state quantity $x_{(t)}$ is determined. Additionally, in the Kalman filter 200, the filter equation represented by equation (11) is set up to use the current determined state quantity $x_{(t/t)}$ and the current input quantity $u_{(t)}$ to predict the next state quantity $x_{(t+1/t)}$. In the Kalman filter 200, the filter equation (11) is solved to predict the state quantity $x_{(t+1/t)}$ for the next time. This next-time state quantity $x_{(t+1/t)}$ is used in determining the state quantity x for the next time.

$$\hat{x}_{(t/t)} = \hat{x}_{(t/t-1)} + K_{K(t)}(y_{(t)} - C_{(t)}\hat{x}_{(t/t-1)}) \quad (10)$$

$$\hat{x}_{(t+1/t)} = A_{(t)}\hat{x}_{(t/t)} + B_{(t)}u_{(t)} \quad (11)$$

The $K_{K(t)}$ in the filter equation (10) is the Kalman filter gain this time. In the Kalman filter 200, the matrix C of the observation equation (2), the matrix $R_K$ of the equation (8), and the prediction error covariance matrix $P_{K(t/t-1)}$ predicted the last time are used to determine the Kalman gain $K_{K(t)}$ for this time. The matrix C of equation (10) corresponds to the matrix C of equation (2), the matrix A of equation (11) corresponds to the matrix A in equation (1), and the matrix B of equation (11) corresponds to the matrix B in equation (1).

Additionally, in the Kalman filter 200, the prediction error covariance matrix $P_{K(t/t-1)}$ predicted last time is used to solve the covariance equation of equation (3) and determine the prediction error covariance matrix $P_{K(t/t)}$ for this time. Additionally, in the Kalman filter 200, the prediction error covariance matrix $P_{K(t/t)}$ determined this time is used to solve the covariance equation of equation (4) and predict the prediction error covariance matrix $P_{K(t+1/t)}$ for the next time. In this manner, in the Kalman filter 200, the current state quantity x and the prediction error covariance matrix $P_K$ are determined as vehicle state quantities. Specifically, predicted values of the lateral displacement η, the lateral displacement speed η', the yaw angle θ, and the yaw rate γ are obtained as state quantities of the vehicle.

Figure 4:
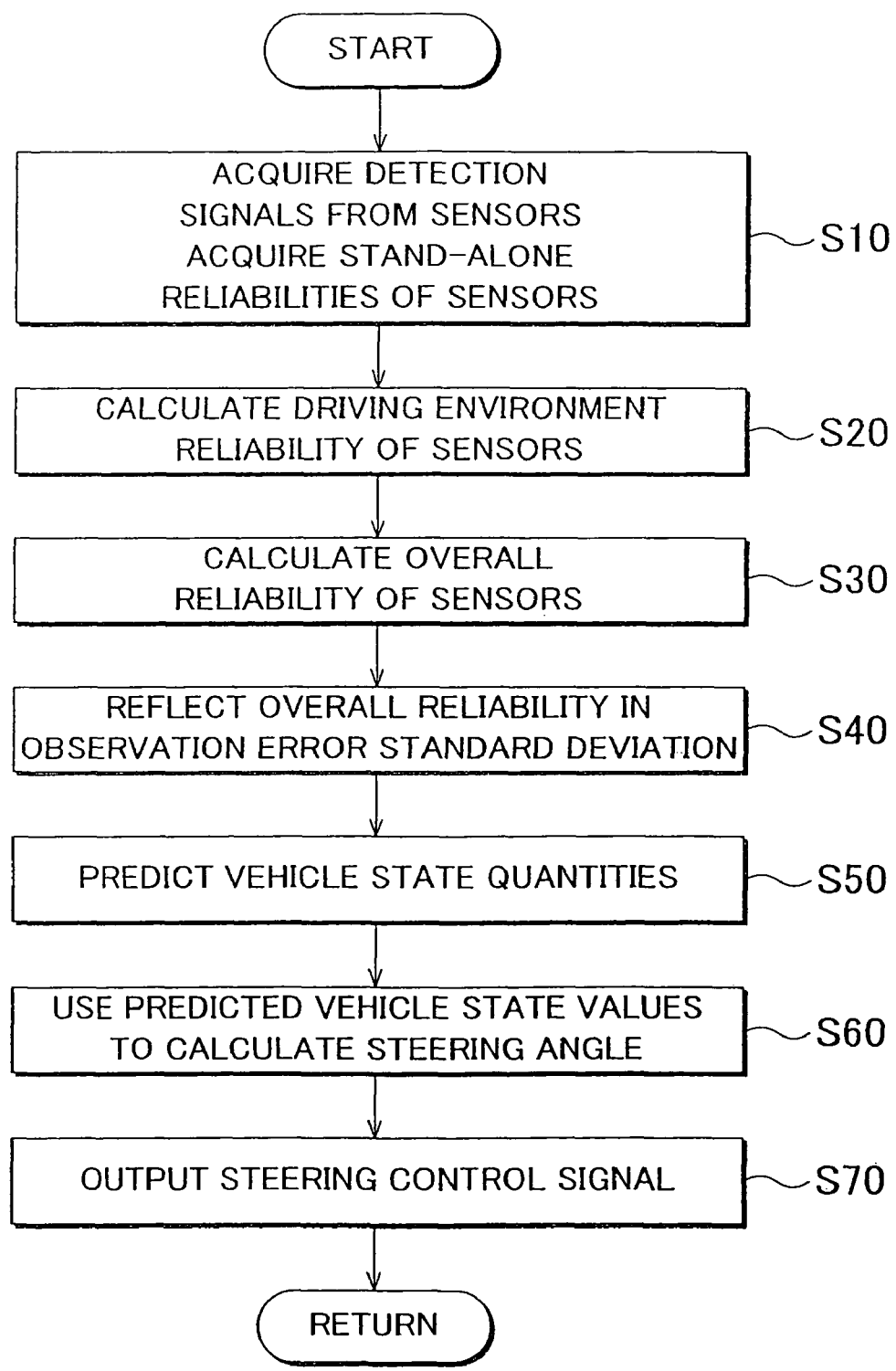
FIG. 4 is a flowchart showing the processing in a control unit.

The control unit 50 executes, for example, the process shown in FIG. 4. In the process shown in FIG. 4, with a prescribed calculation time period enabling a plurality of calculations between neighboring magnetic markers, the Kalman filter 200 calculates the predicted values of state quantities of the vehicle, based on the above-noted state equation (1) and observation equation (2).

In FIG. 4, while the vehicle is in motion the detection signals from sensors such as those shown in FIG. 2 are acquired (step 10). Based on the acquired detection signals, the lateral position D of the vehicle is redundantly calculated by each sensor. That is, the lateral position Dgps of the vehicle is calculated by the detection signal from the GPS receiver 11, the lateral position Dwl of the vehicle is calculated by the detection signal from the white line recognition apparatus 12, and the lateral position Dmag of the vehicle is calculated by the detection signal from the marker sensor 13. The detected yaw rate γy is acquired based on the detection signal from the yaw rate sensor 14. The lateral positions D and the detected yaw rate γy acquired in this manner are used by the Kalman filter 200 to calculate the predicted values of the state quantities of the vehicle.

At step 10, as a prerequisite for the calculation of the observation error standard deviation σ in the observation equation (2), the sensor detection signals related to the lateral positions D and the yaw rate γy are acquired, and the stand-alone reliability of each sensor with respect to the detected value is acquired.

The stand-alone reliability of a sensor indicates the degree of accuracy with regard to the detection signal output from the detector itself that is subjectively determined by the sensor itself. That is, each sensor is capable of subjectively determining the degree of accuracy of its detection results under the associated detection situation. Given this, the subjectively determined accuracy of the detection results of each sensor, determined by the sensor itself, is sent to the control unit 50 as the stand-alone reliability. For example, if the situation sensed by a sensor itself is that the detection error tends to be large, the stand-alone reliability is determined to be low. The stand-alone reliability is quantified, for example, as a value in the range from 0 to 100. The stand-alone reliabilities for each sensor are described below.

The stand-alone reliability of the GPS receiver 11 is set in response to the PDOP (position dilution of precision) indicating deterioration of position accuracy used in the GPS system. The PDOP is an index that indicates the relationship between the observation position error and the satellite position error, where the smaller the number is the better the position accuracy is. The GPS receiver 11 sets a higher stand-alone reliability the smaller the PDOP is, and outputs the set stand-alone reliability along with the detection signal to the control unit 50. For example, the GPS receiver 11 sets the stand-alone reliability in accordance with the equation "stand-alone reliability=100−PDOP×10 (10 in the case in which the PDOP is 10 or greater).

The stand-alone reliability of the white line recognition apparatus 12 is set in response to the white line recognition results from the white line recognition apparatus itself, such as brightness difference, parallelness of the white line, and the tracking accuracy and the like. The white line recognition apparatus 12 sets a higher stand-alone reliability the larger the intensity difference is, and also sets a higher stand-alone reliability the higher the parallelness of the white line is, and the better the tracking is, and outputs the set stand-alone reliability along with the detection signal to the control unit 50.

The stand-alone reliability of the marker sensor (magnetic sensor) 13 is set in response to the magnetic force density distribution profile, the magnetic force intensity, and the like. The marker sensor 13 sets a higher stand-alone reliability the closer the magnetic force density distribution profile is to the ideal profile, and also sets a higher stand-alone reliability higher the larger the magnetic force intensity is, and outputs the set stand-alone reliability along with the detected signal to the control unit 50.

The stand-alone reliability of the yaw rate sensor 14 is set in response, for example, to the spectral intensity of the frequency components of the detection signal. The yaw rate sensor 14 sets a lower stand-alone reliability the greater frequency components are above a predetermined frequency (for example, 10 Hz) that are not likely to be movement of the vehicle, and outputs the set stand-alone reliability along with the detected signal to the control unit 50.

The stand-alone reliability of the G sensor 15 is set in response, for example, to the spectral intensity of the frequency components of the detection signal. The G sensor 15 sets a lower stand-alone reliability the greater the number of frequency components are above a predetermined frequency (10 Hz) that are not likely to be movement of the vehicle, and outputs the set stand-alone reliability along with the detected signal to the control unit 50.

The stand-alone reliability of the wheel speed sensor 16 is set in response, for example, to the shape of the output pulse of the detection signal. Because the spectral distribution of the output pulse changes when a tire puncture, for example, causes elastic deformation of the tires or when some other abnormality occurs, the wheel speed sensor 16 using pattern matching or the like to set a higher the stand-alone reliability the closer the shape of the output pulse is to the ideal pulse shape for a given wheel speed, and outputs the set stand-alone reliability along with the detection signal to the control unit 50.

As described above, at step 10 in FIG. 4, the stand-alone reliabilities of the sensors are acquired, and the driving environment reliability of each sensor is calculated (step 20).

The driving environment reliability of a sensor indicates the degree of accuracy of the detection signal acquired from the sensor, as objectively determined by the control unit 50. That is, the control unit 50 is capable of objectively determining the degree of accuracy of the detection results of a sensor under the associated detection situation. This is based on the concept that, depending upon the detection situation, the sensor detection results are not necessarily an accurate value. Given this, the control unit 50 objectively calculates the accuracy with regard to the detection results of a sensor as the driving environment reliability. For example, for a situation in which the detection environment when the sensor performs a detection operation is such that the detection error tends to increase, the control unit 50 sets the driving environment reliability as a low value. The driving environment reliability is quantified, for example, as a value in the range from 0 to 100. The stand-alone reliabilities for each sensor are described below.

The driving environment reliability of the GPS receiver 11 is set in response to, for example, the conditions of structures in the area surrounding the vehicle (for example, the shapes and locations thereof). The control unit 50, based on map information in the memory unit 20, calculates the driving environment reliability as a low value if the vehicle exists in a location such as in a tunnel or in an area of tall buildings, in which it is difficult to receive a radio signal from a GPS satellite.

The driving environment reliability of the white line recognition apparatus 12 is set in response to such factors as weather, sunlight, and the road surface material. The control unit 50 sets the driving environment reliability to a low value if the detection situation is one in which it is difficult to recognize the white line. In the case of rain or cloudy skies, a lower driving environment reliability is set than in the case of clear skies. Likewise, a lower driving environment reliability is set in the case of the evening than in the case of the daytime, and a lower driving environment reliability is set for concrete road surfaces than for asphalt road surfaces.

The driving environment reliability of the marker sensor 13 is set in response to the magnet burying error, the geomagnetic field, and the structure and material of the road and the like. The control unit 50 sets a lower driving environment reliability for a larger magnet burying error than for a smaller magnet burying error, as well as for a stronger geomagnetic field strength than for a weaker geomagnetic field strength, and for a road structure such as a bridge, which uses a magnetic material as road construction material, than for a road structure that is not constructed from magnetic materials.

The driving environment reliability of the yaw rate sensor 14, the G sensor 15, and the wheel speed sensor 16 are set in response to the road surface roughness, road surface undulation, and the road surface material and the like. The control unit 50 "sets a lower driving environment reliability for a large road surface roughness and undulation than for small surface roughness and undulation.

Common elements for setting the driving environment reliability of each of the sensor include the vehicle shape (vehicle height, width, and length), the vehicle type, and the body material. For example, in the case of a sensor mounted aboard a bus or a truck, because vibration from the vehicle is propagated to the sensor more easily than the case of a normal passenger car, the control unit 50 sets a lower driving environment reliability than the case of a normal passenger car.

As described above, when the stand-alone reliability of the sensors is acquired at step 10 in FIG. 4, and the driving environment reliability of the sensors is calculated at step 20 in FIG. 4, the overall reliability of each sensor is calculated (step 30).

The overall reliability of a sensor indicates the degree of accuracy of the detection signal from the sensor, taking into consideration the above-described stand-alone reliability and driving environment reliability. The overall reliability Ra is calculated and obtained as follows.

$$\text{Overall reliability } Ra = (k1 \times \text{stand-alone reliability} + k2 \times \text{driving environment reliability}) \times \text{freshness} \quad (12)$$

$$\text{Freshness} = f(t) = -K(\kappa, \gamma) \times t/T + 1 \quad (13)$$

In the above, k1 and k2 are coefficients that satisfy the conditions k1+k2=1, $0 \leq k1 \leq 1$, and $0 \leq k2 \leq 1$. T in equation (13) is the measurement time period of the sensor, and t is the elapsed time after the lateral position detection (or after the immediately previous measurement). K is the deterioration coefficient, which is dependent upon the road curvature rate $\kappa$ and the yaw rate $\gamma$.

The deterioration coefficient K is defined, for example, as follows.

$$K(\kappa, \gamma) = j1 + j2 \times |\kappa| + j3 \times |\gamma| \quad (14)$$

In the above, $0 \leq K \leq 1$, and j1, j2, and j3 are arbitrary coefficients.

Figure 5:
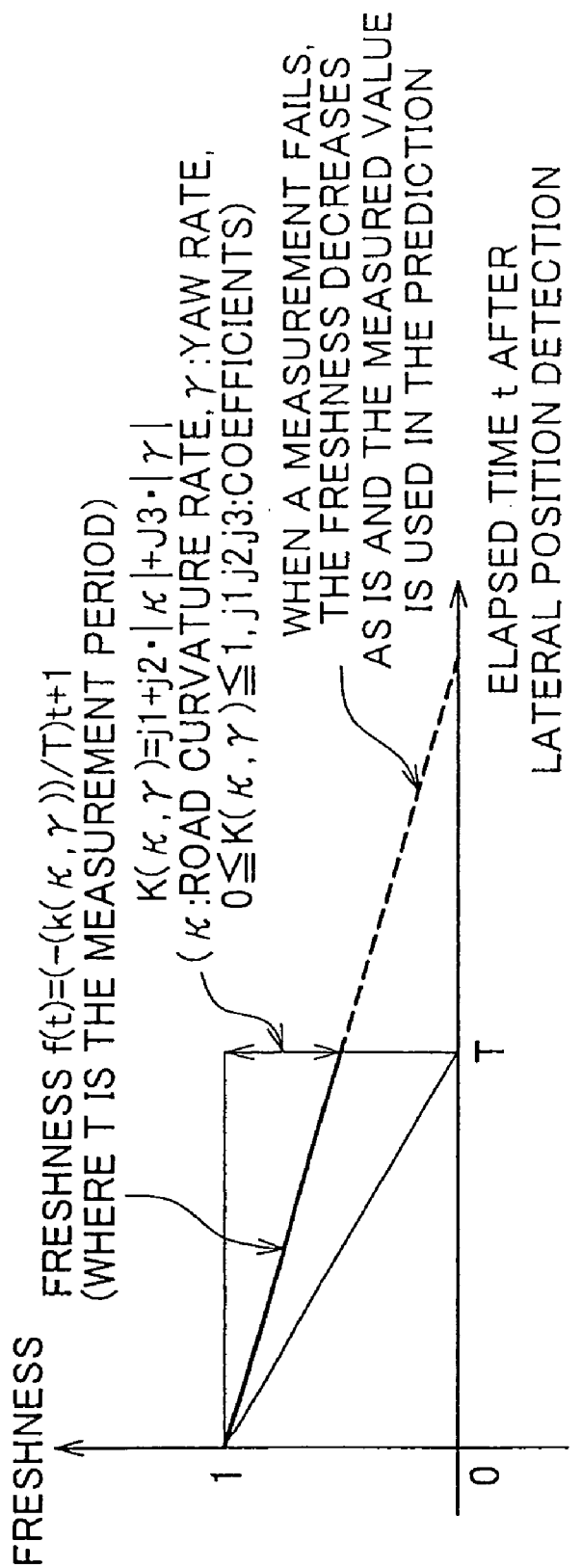
FIG. 5 is a drawing describing the calculation of freshness.

The freshness indicated in equation (13) will now be described with reference to FIG. 5. The freshness is determined for each sensor individually. With each sensor performing an observation of data at a prescribed respective measurement time period, although the reliability of the observed data is high at the time of measurement, the reliability of the observed data decreases as time elapses from the time that the data was obtained (that is, the freshness of the observed data decreases).

For example, when moving along a curve or when the running of the vehicle is not stable, because the degree of change of the observed data from the time of measurement can be envisioned as being greater than in the case of running on a straight road or when running is stable, and there is a particular great possibility of a large change in the lateral position. As a result, it is possible to treat the freshness of the observed data as having decreased at a time after the time of measurement.

Given the above, as shown in equation (13) and equation (14), by adding terms of the road curvature rate $\kappa$ and the yaw rate $\gamma$, which influence the movement related to the lateral position of the vehicle, an equation is set up for calculating the freshness so that the freshness decreases, the larger the road curvature rate $\kappa$ is or the larger the yaw rate $\gamma$ is and, as shown in equation (12), an equation is set up to calculate the overall reliability Ra so that, if the freshness decreases, the overall reliability Ra also decreases. Depending upon the sensor, there are cases in which the measurement fails at the time of measurement. Given this, the freshness is decreased to follow the slope at the time of measurement failure, as shown in FIG. 5, which is reflected in the calculation of the overall reliability Ra.

In equation (14), if the measurement interval is established not as a time but as a distance (specifically, the case of measuring at the time of passing magnetic markers disposed at a prescribed interval), the elapsed distance s can replace the elapsed time t, and the magnetic marker installation spacing S can replace the period T. This can be applied in the case of the magnetic marker 13. The following definition may be adopted.

$$\text{Freshness} = f(s) = -K(\kappa, \gamma) \times s/S + 1 \quad (15)$$

In this case, the horizontal axis represents traveled distance instead of time. If the freshness is calculated for each sensor, the overall reliability Ra of each sensor, in accordance with equation (12) may be quantified as a value in the range from 0 to 100.

As described above, when the overall reliability for each sensor is calculated at step 30 in FIG. 4, the overall reliability is reflected in the observation error standard deviation $\sigma$ in the observation equation (2) (step 40). The observation error standard deviation $\sigma$ is an index that represents whether the observed data measured by a sensor is reliable. The larger the error in the observed data is, the larger the observation error standard deviation becomes. The observation error standard deviation σ is made to reflect the overall reliability Ra calculated as described above. As one approach to causing the overall reliability Ra to be reflected in the observation error standard deviation σ, the observation error standard deviation σ is increased as the overall reliability Ra decreases. Therefore, one example of a method of reflecting the overall reliability Ra in the observation error standard deviation σ is to calculate the standard deviation by simulation or the like under the best measurement condition for each sensor beforehand and, taking the standard deviation under the best measurement condition as σmin, representing the observation error standard deviation σ as follows.

$$\sigma=(100/Ra)\times\sigma min \qquad (16)$$

Because the overall reliability Ra in this embodiment is envisioned as being a value from 0 to 100, the minimum value of the observation error standard deviation σ corresponds to σmin. In this manner, it is possible to change the observation error standard deviation σ term in the observation equation (2) of the Kalman filter 200 in response to the overall reliability Ra of each sensor calculated as described above. In the observation equation (2), the observation error standard deviation of the GPS receiver 11 as σgps, the observation error standard deviation of the white line recognition apparatus 12 as σwl, the observation error standard deviation of the marker sensor 13 as σmag, and the observation error standard deviation of the yaw rate sensor 14 as σγ.

By substituting the observation error standard deviations σ calculated as described above into the observation equation (2), therefore, the above-described prediction calculation of the Kalman filter 200 calculates the predicted values of the state quantities (the lateral position η, the lateral displacement speed η', the yaw angle θ, and the yaw rate γ) (step 50 in FIG. 4).

In this manner, because of the existence of the observation error standard deviation σ term in the observation equation (2), when the observation error standard deviation σ becomes large, the Kalman filter 200 performs the calculation with the observed data that cannot be relied on. As shown as well by the observation equation (2), the lateral position Dgps is observed based on the GPS receiver 11, the lateral position Dwl is observed based on the white line recognition apparatus 12, and the lateral position Dmag is observed based on the marker sensor 13, thereby redundantly observing the lateral positions D. Of the redundantly observed lateral positions D, therefore, the observed data of a sensor having a small observation error standard deviation is easier to use in calculations, and the observed data of a sensor having a large observation error standard deviation is more difficult to use in calculations.

If the predicted values of state quantities are calculated using the processing of the Kalman filter 200 as noted above, the predicted values are used to calculate the steering angle δ to be controlled, according to the following equation (step 60 in FIG. 4). The steering angle δ can be calculated as follows.

$$\delta=K\eta\cdot\eta+K\eta'\cdot\eta'+K\theta(\theta-\theta_{TARGET})+K\gamma(\gamma-\gamma_{TARGET})+\delta f \qquad (17)$$

In equation (17) Kη, Kη', Kθ, and Kγ are constants, $\theta_{TARGET}$ is the target yaw rate, and δf is the feed-forward steering angle. The feed-forward steering angle δf is determined based on the vehicle model, the road curvature rate, the bank angle, and the vehicle speed and the like. When the steering angle δ to be controlled is calculated, steering control signal based on the steering angle δ is output to the steering actuator 32 from the control unit 50 as shown in FIG. 2, the steering actuator 32, in response to the steering control signal, performing drive (step 70 in FIG. 4). Subsequently, the above-noted processing is repeatedly executed. In this manner, the processing of the Kalman filter 200 is repeatedly executed, the result being that the predicted values of the state quantities such as the lateral position η and the yaw rate γ successively converge to the values of the state quantities that should be obtained.

According to this embodiment, therefore, the control unit 50 calculates the overall reliability from the driving environment reliability, which takes into consideration the stand-alone reliability based on the processing results from each sensor and the advantages and disadvantages of each sensor for the measurement conditions. The control unit 50 also calculates the freshness, in accordance with the elapsed time (or traveled distance) from the asynchronous timing of each sensor, and causes the calculated overall reliabilities and freshnesses to be reflected in the observation error standard deviation σ and performs Kalman filter prediction. The result is that, even between magnetic markers, the lateral displacement measured at the immediately preceding time is used in the Kalman filter prediction, thereby enabling improvement in the accuracy and reliability of state quantity prediction by the Kalman filter. That is, it is possible to maintain the accuracy of predicted values of state quantities between magnetic markers, so that even if the observation period of state quantity at a prescribed check point at which a magnetic marker or the like is installed increases, it is possible to implement a vehicle state quantity prediction apparatus that more accurately predicts the state quantities of a vehicle. It is further possible to implement a vehicle steering controller capable of more accurate steering control of the vehicle using such a vehicle state quantity prediction apparatus.

While the foregoing is a description of an embodiment of the present invention, the present invention is not restricted to the above-noted embodiment, but the invention encompasses various forms, modifications, and replacements, within the scope and spirit of the present invention.

Figure 6:
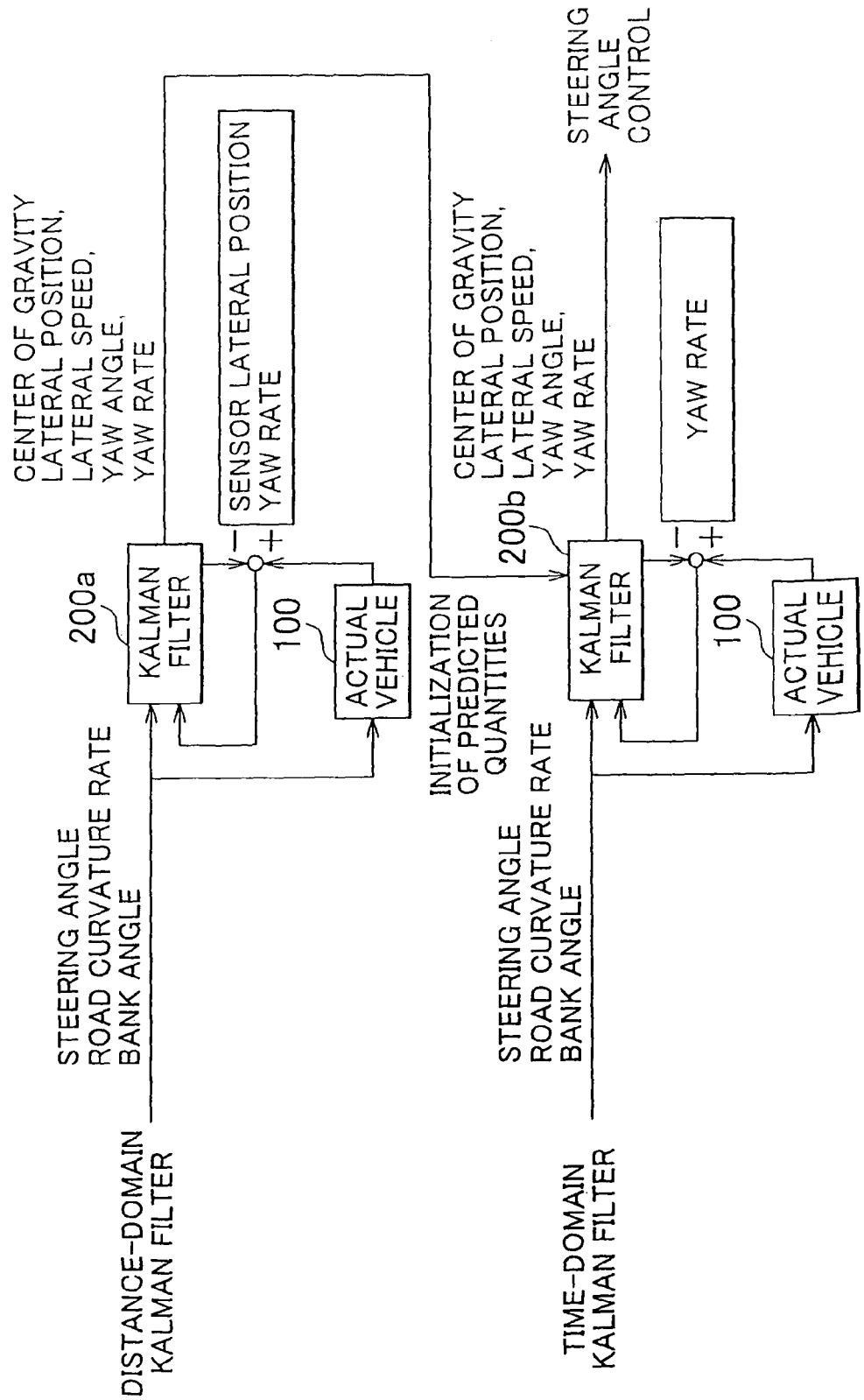
FIG. 6 is a block diagram describing the method used in a Kalman filter.

For example, an embodiment of the present invention may be made with the Kalman filter configuration shown in FIG. 6. The Kalman filter shown in FIG. 6 has a distance-domain Kalman filter that calculates the predicted values of state quantities of the vehicle 100 (yaw rate, yaw angle, lateral displacement speed, and lateral position) in accordance with the function of the Kalman filter 200a each time a magnetic marker is detected, and a time-domain Kalman filter that calculates the predicted values of state quantities of the vehicle 100 (yaw rate, yaw angle, lateral displacement speed, and lateral position) in accordance with the function of the Kalman filter 200b for each prescribed period. The Kalman filter shown in FIG. 6, by initializing the state quantities of the time-domain Kalman filter 200b that predicts state quantities with only yaw rate as an observed value using the predicted values of the distance-domain Kalman filter 200b that predicts state quantities using the lateral position and yaw rate at the time of passing a magnetic marker as observed values, improves the accuracy of predicting the state quantities between magnetic markers where it is not possible to measure the lateral position. If the same type of normalization is performed for the distance-domain Kalman filter 200a and the time-domain Kalman filter 200b as in the state equation (1) the observation equation (2), in which the above-described overall reliability and reliability are reflected in the observation error standard deviation σ, the accuracy and reliability of state quantity prediction are improved.

Although the foregoing embodiment calculates the driving environment reliability for each vehicle individually, alternatively a database of driving environment reliabilities may be created, and each vehicle may acquire the driving environment reliability from the database. For example, each vehicle may send the measurement result and stand-alone reliability of each sensor to a prescribed control center, the running condition at the time of measurement by each sensor, and measured information such as weather and road surface condition for the same position. The control center then acquires the measured information from each vehicle, and statistically creates a reliability database for each sensor, using the running condition, the weather, and the road surface condition and the like as indices. Each vehicle may then acquire the driving environment reliability from the reliability database at the control center, via a communication circuit, such as between the road and the vehicle, for use in the above-noted state quantities prediction. By doing this, compared to the driving environment reliability calculated at each vehicle, it is possible to derive the driving environment reliability with a greater degree of objectivity.

Although the foregoing embodiment is described in the context of a Kalman filter, a predictor that predicts state quantities that describes the movement of a vehicle by inputting prescribed state quantities measured by sensors into model of the movement of a vehicle is not limited to a Kalman filter. It is sufficient that the predictor perform repeated calculation so as to cause convergence of the predicted values to true values. It is sufficient if the predictor causes a value determining the degree to which a value measured by a sensor can be trusted (in the case of the Kalman filter of this embodiment, the observation error standard deviation σ) to reflect the sensor reliability.

The invention claimed is:

1. A vehicle state quantity prediction apparatus, comprising:
   a plurality of observation apparatuses that observe prescribed state quantities representing movement of a vehicle;
   a prediction apparatus that inputs the prescribed state quantities observed by the observation apparatuses into a vehicle model to predict state quantities representing the movement of the vehicle; and
   an evaluation apparatus that sets a reliability of the prescribed state quantities observed by the observation apparatuses for each observation apparatus, wherein
   a degree to which the prescribed state quantities observed by the observation apparatuses is reflected in the model is set based on the reliability set by the evaluation apparatus.

2. The vehicle state quantity prediction apparatus according to claim 1, wherein the evaluation apparatus sets the reliability based on an observed state that is determined based on observation results of the observation apparatuses themselves, and sets a lower reliability as an observation error of the observed state increases.

3. The vehicle state quantity prediction apparatus according to claim 1, wherein the evaluation apparatus sets the reliability based on an observation environment when the prescribed state quantity is observed, and sets a lower reliability as an observation error in the observation environment increases.

4. The vehicle state quantity prediction apparatus according to claim 1, wherein the evaluation apparatus sets the reliability based on an elapsed time since the prescribed state quantity was observed, and sets a lower reliability as the elapsed time increases.

5. The vehicle state quantity prediction apparatus according to claim 1, wherein the evaluation apparatus sets the reliability based on a traveled distance from an observation point at which the prescribed state quantity was observed, and sets a lower reliability as the traveled distance increases.

6. The vehicle state quantity prediction apparatus according to claim 1, wherein the evaluation apparatus is a Kalman filter, in which a term of a standard deviation of an observation error of each observed value is added to an observation equation of the Kalman filter, and wherein the standard deviation is increased as the reliability decreases.

7. The vehicle state quantity prediction apparatus according to claim 1, wherein the reliability is created as a database from which the vehicle acquires the reliability.

8. A vehicle steering controller, comprising:
   the vehicle state quantity prediction apparatus according to claim 1; and
   a control signal generator that generates a steering actuator control signal in a steering system, based on the state quantity describing the movement of the vehicle predicted by the vehicle state quantity prediction apparatus.

9. A method for predicting a state quantity of a vehicle, the method executed by a control unit receiving inputs from a plurality of sensors, the method comprising:
   the control unit observing a plurality of prescribed state quantities that describe movement of a vehicle and that are supplied by the sensors;
   the control unit inputting the observed prescribed state quantities into a model of the movement of the vehicle to predict state quantities representing the movement of the vehicle;
   the control unit setting a reliability of the observed prescribed state quantities for each observation; and
   the control unit setting a degree to which the observed prescribed state quantities are reflected in the model based on the set reliability.

10. The method for predicting a state quantity of a vehicle according to claim 9, wherein the reliability is set based on an observed state that is determined based on a result of the observation, and a lower reliability is set as an observation error of the observed state increases.

11. The method for predicting a state quantity of a vehicle according to claim 9, wherein the reliability is set based on an observation environment when the prescribed state quantity is observed, and a lower reliability is set as an observation error in the observation environment increases.

12. The method for predicting a state quantity of a vehicle according to claim 9, wherein the reliability is set based on an elapsed time since the prescribed state quantity was observed, and a lower reliability is set as the elapsed time increases.

13. The method for predicting a state quantity of a vehicle according to claim 9, wherein the reliability is set based on a traveled distance from an observation point at which the prescribed state quantity was observed, and a lower reliability is set as the traveled distance increases.

14. The method for predicting a state quantity of a vehicle according to claim 9, wherein the setting of the reliability uses a Kalman filter, in which a term of a standard deviation of an observation error of each observed value is added to an observation equation of the Kalman filter, and wherein the standard deviation is increased as the reliability decreases.

15. The method of predicting a state quantity of a vehicle according to claim 9, wherein the reliability is created as a database from which the vehicle acquires the reliability.

16. A vehicle steering control method, comprising:
   predicting a state quantity that describes movement of a vehicle by the method of predicting a state quantity of a vehicle according to claim 9; and
   generating a steering actuator control signal in a steering system, based on the state quantity describing the movement of the vehicle.

* * * * *